(12) United States Patent
Akiyama

(10) Patent No.: US 8,547,905 B2
(45) Date of Patent: Oct. 1, 2013

(54) WIRELESS BASE STATION AND COMMUNICATION METHOD

(75) Inventor: Chiyoshi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 250 days.

(21) Appl. No.: 13/017,237

(22) Filed: Jan. 31, 2011

(65) Prior Publication Data

US 2011/0230180 A1    Sep. 22, 2011

(30) Foreign Application Priority Data

Mar. 17, 2010    (JP) ................................. 2010-060882

(51) Int. Cl.
*H04W 4/00*    (2009.01)

(52) U.S. Cl.
USPC ......................................................... 370/328

(58) Field of Classification Search
USPC ......................................................... 370/328
See application file for complete search history.

(56) References Cited

U.S. PATENT DOCUMENTS

| | | | | |
|---|---|---|---|---|
| 6,141,335 | A * | 10/2000 | Kuwahara et al. | 370/342 |
| 2005/0053023 | A1 * | 3/2005 | Rajkotia et al. | 370/312 |
| 2007/0160019 | A1 * | 7/2007 | Classon et al. | 370/338 |
| 2007/0287501 | A1 | 12/2007 | Hoshina et al. | |
| 2010/0048220 | A1 * | 2/2010 | Taira et al. | 455/450 |
| 2010/0159974 | A1 * | 6/2010 | Katayama | 455/513 |
| 2011/0134875 | A1 * | 6/2011 | Ding et al. | 370/329 |

FOREIGN PATENT DOCUMENTS

| | | |
|---|---|---|
| CN | 101150864 | 3/2008 |
| CN | 101395892 | 3/2009 |
| JP | 8-242489 | 9/1996 |
| JP | 2007-329758 | 12/2007 |
| JP | 2008-503187 | 1/2008 |
| JP | 2008-270915 | 11/2008 |
| KR | 10-2006-0069226 | 6/2006 |
| WO | 2005/125021 | 12/2005 |
| WO | 2009/067454 | 5/2009 |

OTHER PUBLICATIONS

Korean Notice of Preliminary Rejection dated Apr. 18, 2012, from Korean Application No. 10-2011-3865.
Japanese Office Action dated May 21, 2013, from corresponding Japanese Application No. 2010-060882.
Chinese First Office Action dated May 6, 2013, from corresponding Chinese Application No. 201110045205.8.

* cited by examiner

*Primary Examiner* — Steven H Nguyen
*Assistant Examiner* — Saad A Waqas
(74) *Attorney, Agent, or Firm* — Katten Muchin Rosenman LLP

(57) ABSTRACT

A wireless base station includes an antenna for communicating with a terminal in a coverage area; a transmitting unit that transmits to an adjacent wireless base station via the antenna, configuration information used by the wireless base station to control communication with the terminal; a receiving unit that receives configuration information of the adjacent wireless base station via the antenna; and a configuration information controlling unit that sets configuration information of the wireless base station, based on the configuration information of the adjacent wireless base station received by the receiving unit.

11 Claims, 8 Drawing Sheets

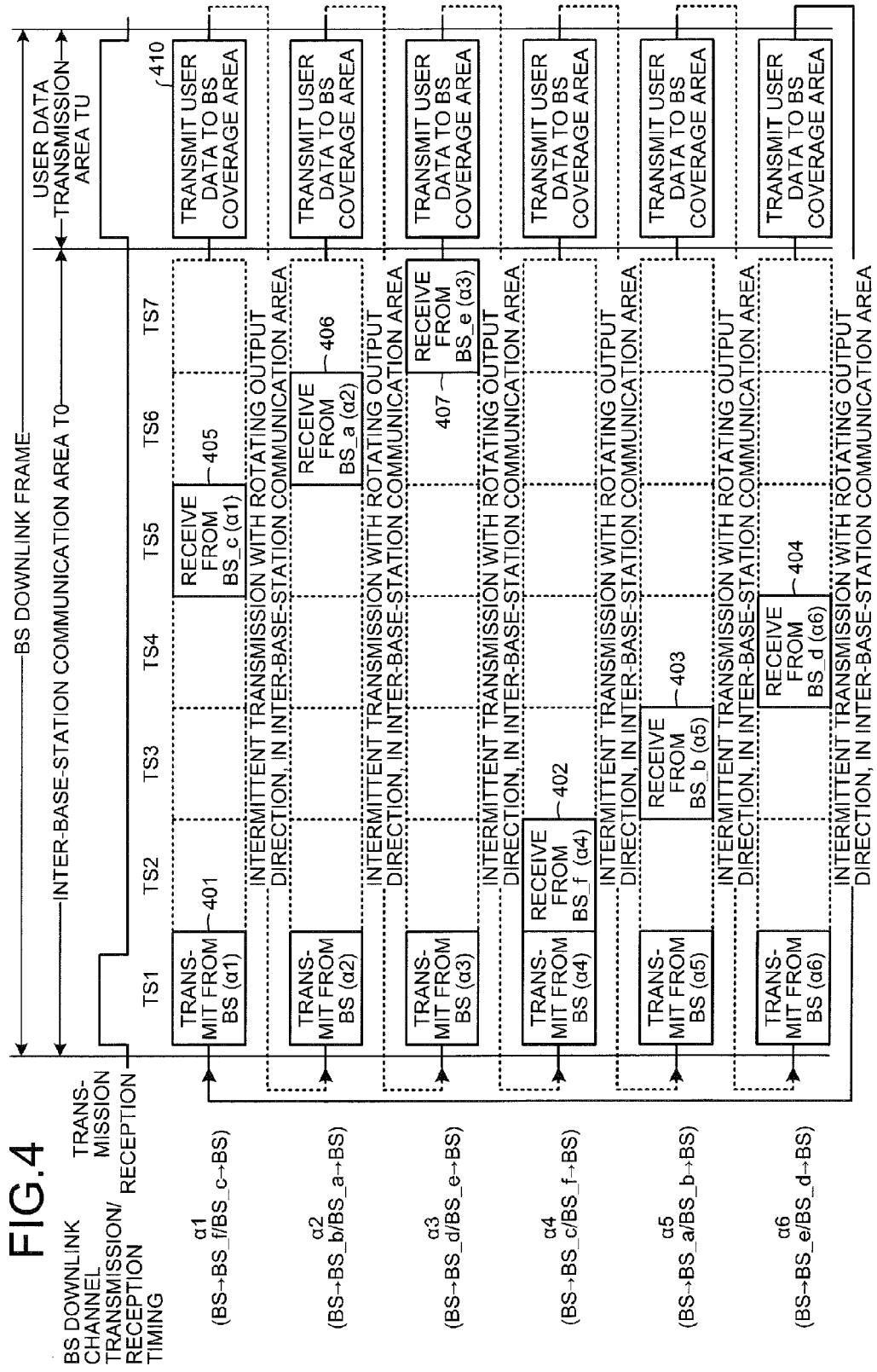

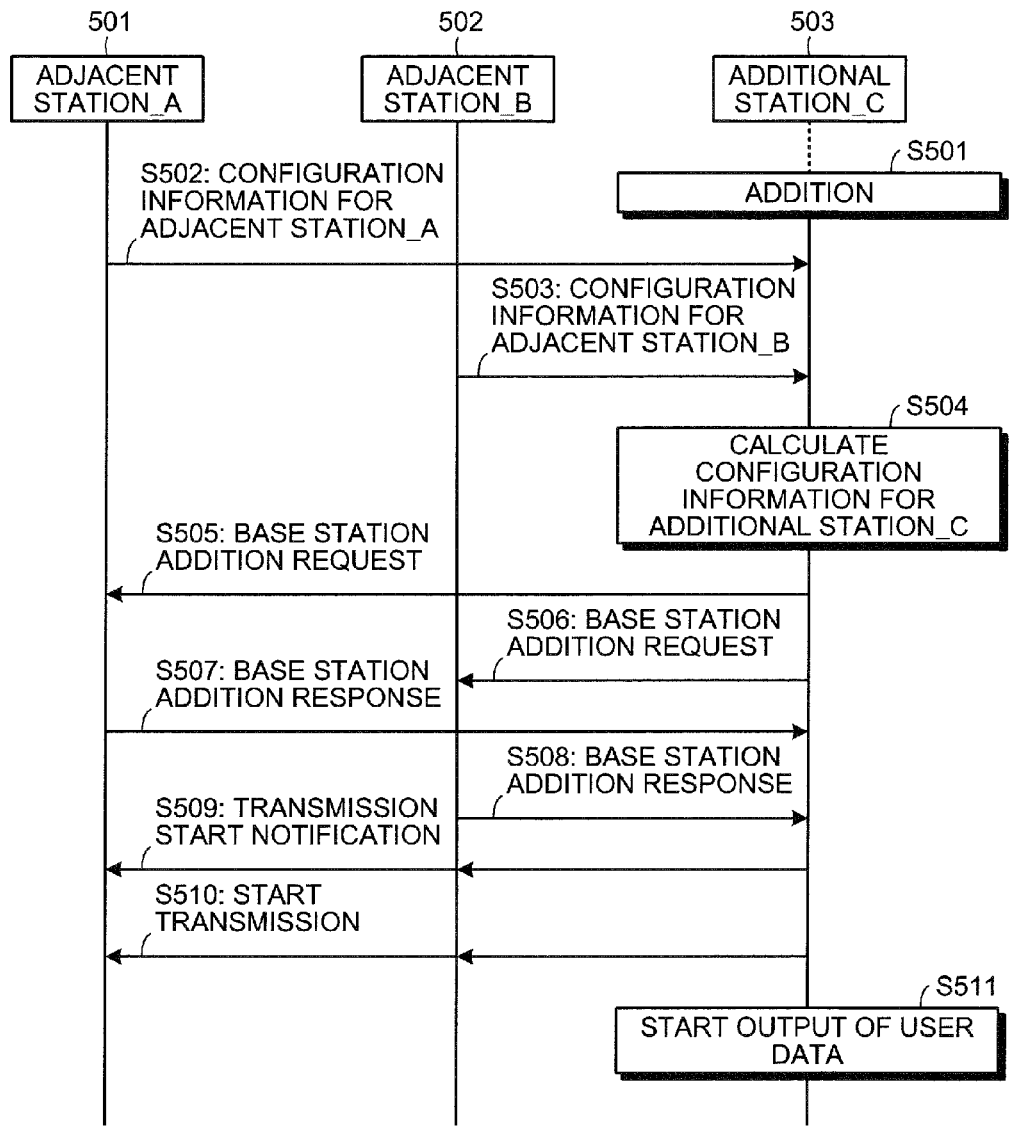

WIRELESS BASE STATION AND COMMUNICATION METHOD

CROSS REFERENCE TO RELATED APPLICATIONS

This application is based upon and claims the benefit of priority of the prior Japanese Patent Application No. 2010-060882, filed on Mar. 17, 2010 the entire contents of which are incorporated herein by reference.

FIELD

The embodiments discussed herein are related to a wireless base station and a communication method.

BACKGROUND

Conventionally, wireless base stations (radio base stations) in a cellular system are connected, via a wired transmission interface, to a radio network controller (RNC), an upper level apparatus, to which the wireless base stations are subordinate (or to an access gateway apparatus). The radio network controller integrally monitors and controls configuration information of each wireless base station, such as coverage area, channel accommodation capacity, and transmission power, through the wired transmission interface.

In the communication of information between wireless base stations subordinate to one radio network controller, the radio network controller is capable of monitoring and controlling configurations of the subordinate wireless base stations using the wired transmission interface in the radio network controller.

Some techniques are known that allow adjacent wireless base stations to share information held by each wireless base station. For example, one such technique is for a small-scale zone configuration and allows a user to set up a wireless base station freely in CDMA-based communication (see, e.g., Japanese Laid-Open Patent Publication No. 2007-329758). According to this technique, when a wireless base station is set up and started, processing of an uplink base band signal from a terminal is switched over to a process of receiving a signal from a common downlink channel of an another wireless base station to measure report information and signal levels of surrounding wireless base stations. Through this process, the setting of spread codes, transmission power, etc., necessary for setting up the wireless base station is carried out automatically (see, e.g., Japanese Laid-Open Patent Publication No. 2007-329758). In this configuration, the wireless base station is able to acquire the setup statuses and radio wave propagation conditions of other surrounding wireless base stations in a wireless access system, the setup statuses and propagation conditions being dependent on the place of setup.

Another technique is for building a service area by setting up wireless base stations in an OFDM system (see, e.g., Japanese Laid-Open Patent Publication No. 2008-270915). According to this technique, when a wireless base station is set up and started, processing of an uplink base band signal from a terminal is switched over to a process of receiving a downlink signal from an another wireless base station to measure working carrier wave frequency information and signal levels of surrounding wireless base stations. Through this process, the carrier wave frequency having the least interference is selected and the setting of transmission power, etc. is automatically carried out. This configuration enables acquisition of the setup statuses and radio wave propagation conditions of other surrounding wireless base stations in a wireless access system, the setup statuses and propagation conditions being dependent on the place of setup of the wireless base station.

If central monitoring and control is carried out by a radio network controller (access gateway apparatus), as in the case of the conventional techniques, wireless base stations subordinate to the radio network controller are limited in number. For this reason, when information is transmitted between wireless base stations subordinate to different radio network controllers and such wireless base stations are controlled, communication via an additional upper level apparatus is carried out, requiring a wired transmission interface between radio network controllers.

When additional wireless base stations are set up to deal with a change in a radio environment or an increase in the number of users, a wired transmission interface is newly provided between radio network controllers. The radio network controller is, however, limited in the number of wireless base stations that can be accommodated. As a result, load on the radio network controller increases, leading to complicated control processes.

According to the technique recited in Japanese Laid-Open Patent Publication No. 2007-329758, a wireless base station measures report information and the signal level of an adjacent wireless base station without communication through a radio network controller and based on this information, is able to autonomously determine configuration information in the wireless base station. Common channel power output from an adjacent wireless base station is, however, determined to be of a magnitude that causes radio waves to reach an additionally set up wireless base station. Configuration information of the adjacent wireless base station, therefore, cannot be altered automatically after setting up the additional wireless base station. As a result, radio waves output from the additionally set up wireless base station have an output power that interferes with radio waves from an adjacent wireless base station. This gives rise to a problem in that the number of users that can be accommodated by the wireless base stations decreases.

The technique disclosed in Japanese Laid-Open Patent Publication No. 2007-329758 is related to a configuration for startup of a new wireless base station and therefore, does not enable automatic adjustment of configuration information between wireless base stations adjacent to each other during actual operation. An attempt to alter the configuration information during actual operation would force communication service to come to a halt. The technique disclosed in Japanese Laid-Open Patent Publication No. 2008-270915 is implemented by applying the technique disclosed in Japanese Laid-Open Patent Publication No. 2007-329758 to an OFDM system, thus poses a problem similar to the problem related to the technique disclosed in Japanese Laid-Open Patent Publication No. 2007-329758.

In this manner, according to the conventional techniques, a wireless base station receives common channel output from an adjacent wireless base station to autonomously determine configuration information of the wireless base station. Both techniques, however, are related to actions that are taken at the startup of the wireless base stations. Because no communication is carried out between adjacent wireless base stations in actual operation following the startup, the adjacent wireless base stations are not able to share configuration information. As a result, the adjacent wireless base stations are unable to have the optimum configuration information after the start of operation. If the configuration information of each of the wireless base stations is not optimized, it is impossible to deal with a change in the radio wave environment and with fluctuations in the number of users.

SUMMARY

According to an aspect of an embodiment, a wireless base station includes an antenna for communicating with a terminal in a coverage area; a transmitting unit that transmits to an adjacent wireless base station via the antenna, configuration information used by the wireless base station to control communication with the terminal; a receiving unit that receives configuration information of the adjacent wireless base station via the antenna; and a configuration information controlling unit that sets configuration information of the wireless base station, based on the configuration information of the adjacent wireless base station received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a timing chart of a communication process by the wireless base station.

FIG. 5 is a sequence diagram of exchanges of information between an additional station and adjacent stations.

DESCRIPTION OF EMBODIMENTS

Preferred embodiments of the present invention will be explained with reference to the accompanying drawings.

Figure 1:
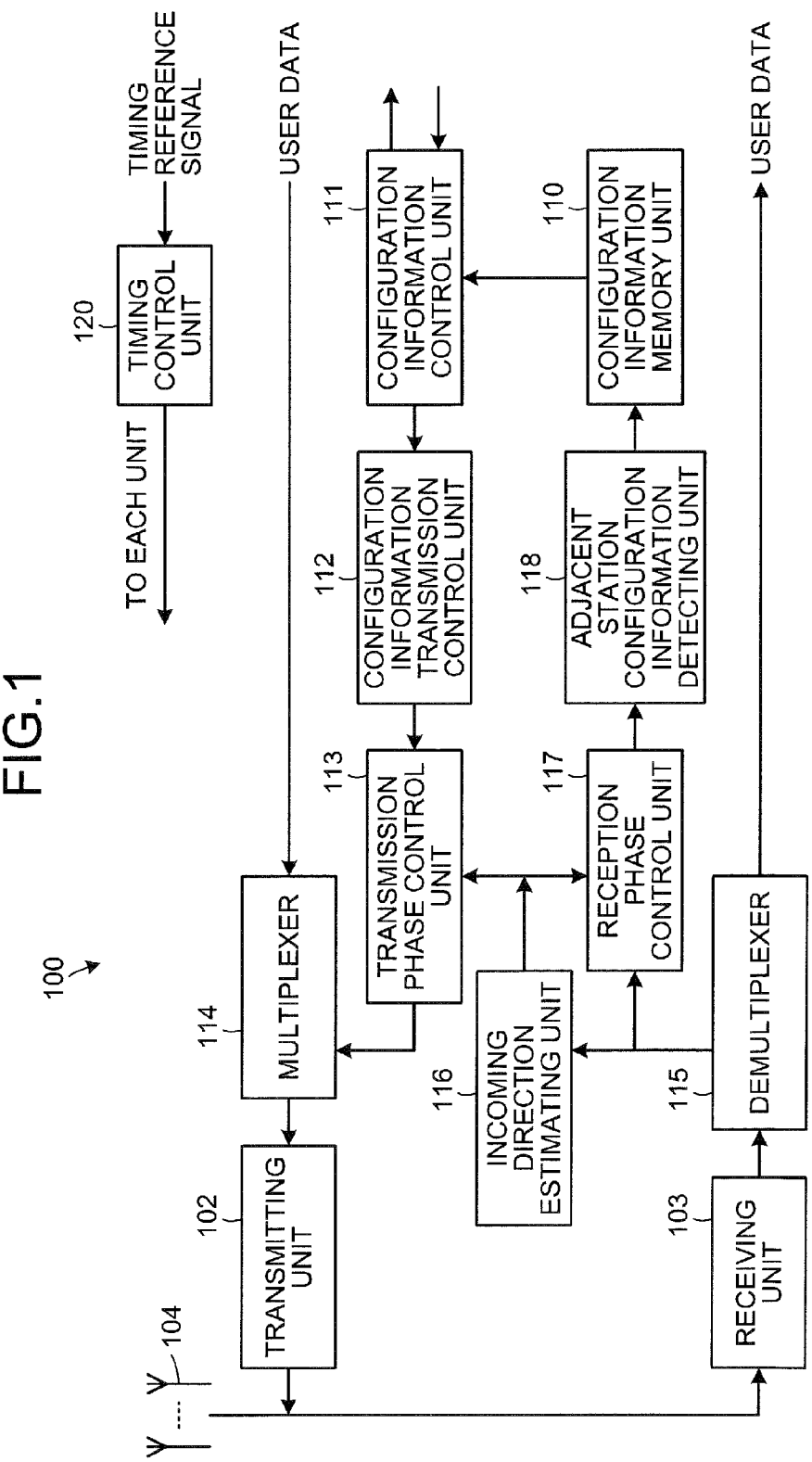
FIG. 1 is a block diagram of a configuration of a wireless base station according to an embodiment.

FIG. 1 is a block diagram of a configuration of a wireless base station according to an embodiment. A wireless base station 100 includes a transmitting unit 102, a receiving unit 103, and an arrayed antenna 104 through which directional radio waves are transmitted and received. Basically, the wireless base station 100 communicates and exchanges uplink/downlink user data with a terminal (not depicted) located in the coverage area of the wireless base station 100.

This embodiment (configuration example depicted in FIG. 1) principally relates to a configuration in which the wireless base station 100 wirelessly communicates directly with another wireless base station (adjacent station) adjacent to the wireless base station 100 to exchange configuration information. The wireless base station 100 transmits the configuration information to the adjacent wireless base station through the arrayed antenna 104 by rotating a directional beam.

A configuration information memory unit 110 stores configuration information of the wireless base station 100 and configuration information of other wireless base stations adjacent to the wireless base station 100. The configuration information of the wireless base station 100 and that of the adjacent wireless base stations includes parameters used for communication control, such as position information, the number of users in a coverage area, transmission power, and transmission timing (which will be described in detail hereinafter).

A configuration information control unit 111 reads out the configuration information for the wireless base station 100 (position information, the number of users in the coverage area of the wireless base station 100, transmission power, transmission timing, etc.) from the configuration information memory unit 110, and outputs the read configuration information to a configuration information transmission control unit 112 of the wireless base station 100. By inputting a request and setting parameters to the configuration information control unit 111, the configuration information is input from and output to external stations. To transmit the configuration information of the wireless base station 100 to an adjacent wireless base station, the configuration information transmission control unit 112 of the wireless base station 100 controls framing and timing, and outputs the configuration information to a transmission phase control unit 113.

If position information of an adjacent wireless base station and the incoming direction of a directional beam from the adjacent wireless base station are defined, the transmission phase control unit 113 controls the phase of each of array element making up the arrayed antenna 104 so that the antenna 104 transmits the configuration information of the wireless base station 100 toward the adjacent wireless base station. When another wireless base station may be additionally set up adjacent to the wireless base station 100, the additional adjacent wireless base station is able to search for the position and direction of the wireless base station 100. In this case, based on a timing reference signal, such as a GPS signal, a timing control unit 120 controls the phase of each of array element to adjust the directional beam from the wireless base station 100 so that the beam rotates at timing and a period synchronized with the adjacent wireless base station. The adjusted directional beam is output to a multiplexer 114. The timing control unit 120 controls the timing of each component of the wireless base station 100, based on the timing reference signal.

The multiplexer 114 multiplexes user data to be transmitted to a terminal in the coverage area of the wireless base station 100 and a directional beam carrying the configuration information for the adjacent wireless base station, and outputs the multiplexed user data and directional beam to the transmitting unit 102. The transmitting unit 102 converts the user data and configuration information into a given radio frequency signal and outputs the radio frequency signal to the arrayed antenna 104. The arrayed antenna 104 then transmits the configuration information included in the directional beam to the adjacent wireless base station, and also transmits the user data to the terminal in the coverage area of the wireless base station 100.

Configuration information transmitted from the adjacent wireless base station is received by the wireless base station 100. Configuration of the wireless base station 100 for reception is such that the wireless base station 100 receives a directional beam output from the adjacent wireless base station and a signal output from the terminal in the coverage area of the wireless base station 100 through the arrayed antenna 104, and outputs the received directional beam and signal to the receiving unit 103, which converts the frequency of the received radio signal to an internal frequency and outputs the resulting radio signal to a demultiplexer 115.

The demultiplexer 115 separates the user data from the terminal in the coverage area of the wireless base station 100 and the information of the directional beam from the adjacent wireless base station, and outputs the information of the directional beam to an incoming direction estimating unit 116 and to a reception phase control unit 117. The incoming direction estimating unit 116 determines the incoming direction of the directional beam from the adjacent wireless base station. The incoming direction is output to the transmission phase control unit 113 to control the transmission phase of a directional beam to be output to the adjacent wireless base station and to the reception phase control unit 117.

The reception phase control unit (117 determines the phase of each array element based on the incoming direction of the directional beam output from the adjacent wireless base station to demodulate the directional beam output from the adjacent wireless base station, and outputs the configuration information of the adjacent wireless base station to an adjacent station configuration information detecting unit 118. Based on the incoming directions of directional beams respectively output from adjacent wireless base stations, the transmission phase control unit 113 synchronizes the rotation of a directional beam to be transmitted from the wireless base station 100. The adjacent station configuration information detecting unit 118 detects the configuration information of an adjacent wireless base station from data of the demodulated directional beam, and outputs the detected configuration information to the configuration information memory unit 110. The configuration information memory unit 110 stores therein the configuration information of the adjacent wireless base station together with the configuration information of the wireless base station 100.

Figure 2:
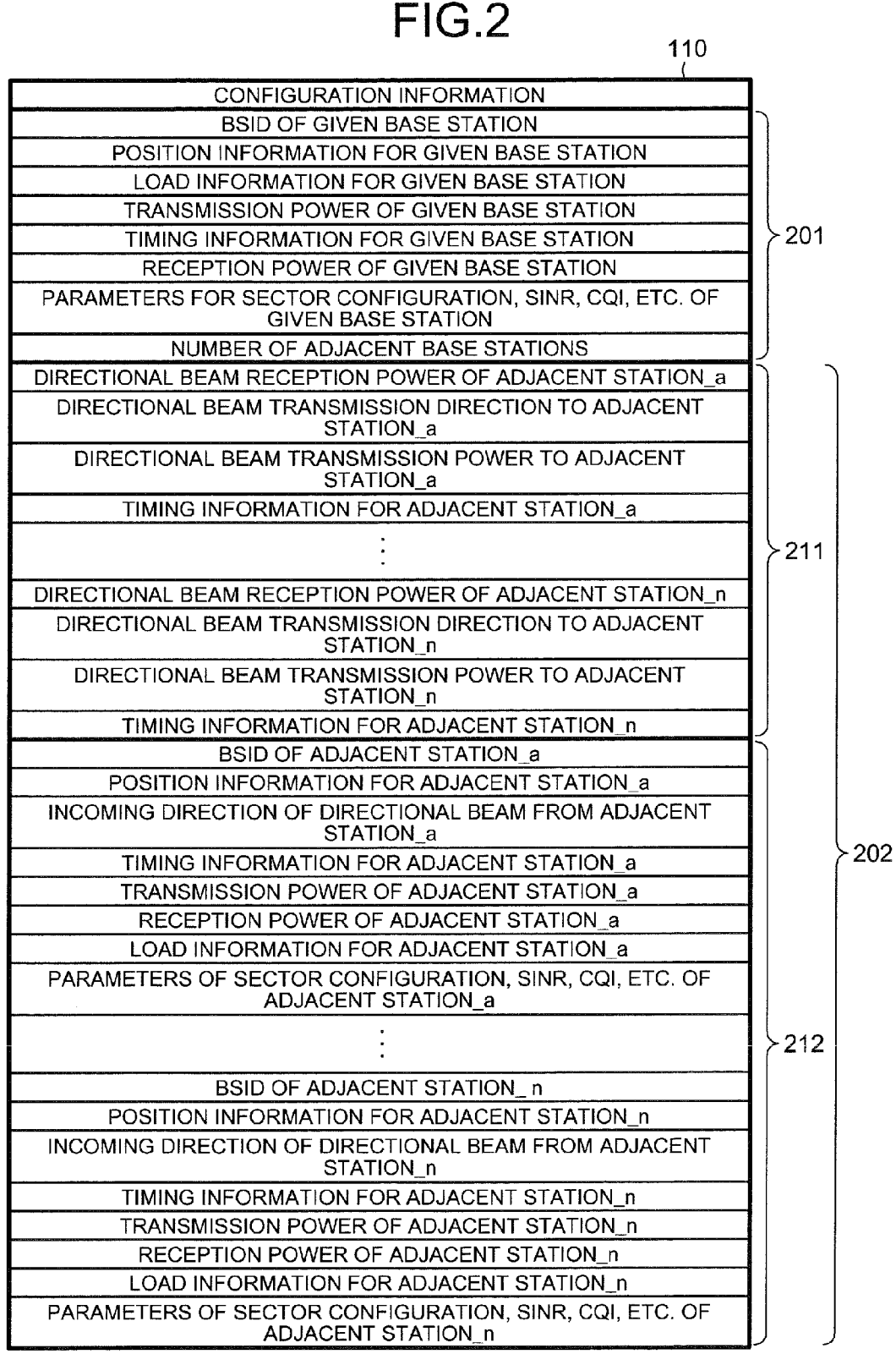
FIG. 2 is a diagram of an example of configuration information stored in a configuration information memory unit.

FIG. 2 is a diagram of an example of configuration information stored in the configuration information memory unit. The configuration information memory unit 110 stores configuration information 201 for the wireless base station 100 and configuration information 202 for adjacent stations (a to n). The configuration information 201 of the wireless base station 100 includes a BSID of the wireless base station 100, position information for the wireless base station 100, load information for the wireless base station 100, transmission power of the wireless base station 100, timing information for the wireless base station 100, reception power of the wireless base station 100, parameters for sector configuration of the wireless base station 100, SINR, CQI, etc., and the number of adjacent stations. The BSID of the wireless base station 100 is an identification number for the wireless base station 100. The position information is position information indicative of the latitude and longitude of the wireless base station 100 as measured by GPS. The load information is load information indicative of the number of users to be handled by the wireless base station 100. The transmission power is the transmission power of the coverage area (cell/sector) of the wireless base station 100. The timing information is information concerning the timing of transmission/reception by the wireless base station 100. The reception power is the reception power of the coverage area (cell/sector) of the wireless base station 100. The parameters of sector configuration, SINR, CQI, etc., represent station parameter information indicative of a sector configuration of the wireless base station 100, etc. The number of adjacent stations is the number of stations adjacent to the wireless base station 100.

The adjacent station configuration information 202 is configuration information of an adjacent station that is received via the reception-side system. The adjacent station configuration information 202 includes communication information 211 for communication with the adjacent station and configuration information 212 unique to the adjacent station. The communication information 211 for communication with adjacent station_a includes the directional beam reception power of adjacent station_a, directional beam transmission direction to adjacent station_a, directional beam transmission power to adjacent station_a, and timing information for adjacent station_a. As depicted in FIG. 2, the communication information 211 is set for each of the adjacent stations (a to n) adjacent to the wireless base station 100.

The configuration information 212 is unique to each adjacent station and includes the BSID of the adjacent station, position information for the adjacent station, the incoming direction of a directional beam from the adjacent station, timing information for the adjacent station, the transmission power of the adjacent station, the reception power of the adjacent station, load information for the adjacent station, and parameters of sector configuration, SINR, CQI, etc. of the adjacent station. With respect to the configuration information 212 of adjacent station_a, the BSID of adjacent station_a is a base station identification number for adjacent station_a and is detected from configuration information included in a directional beam from adjacent station_a. The position information for adjacent station_a indicates the position of adjacent station a and is GPS (latitude/longitude) information detected from the directional beam from adjacent station_a. The incoming direction of a directional beam from adjacent station_a is the incoming direction of a directional beam transmitted by adjacent station_a and includes a sector antenna number corresponding to the incoming direction. The timing information for adjacent station_a indicates the timing of transmission/reception by adjacent station_a and is detected from the configuration information included in the directional beam from adjacent station_a.

The transmission power of adjacent station_a is set for each sector in the case of a sector configuration and is detected from the configuration information included in the directional beam from adjacent station_a. The reception power of adjacent station_a is set for each sector in the case of sector configuration and is detected from the configuration information included in the directional beam from adjacent station_a. The load information for adjacent station_a is indicative of the number of users to be handled by adjacent station_a, is set for each sector in the case of sector configuration, and detected from the configuration information included in the directional beam from the adjacent station a. The parameters for the sector configuration, SINR, CQI, etc. of adjacent station_a represent station parameter information indicative of the sector configuration of adjacent station_a, etc., and is set for each sector in the case of sector configuration and detected from the configuration information included in the directional beam from adjacent station_a. As depicted in FIG. 2, the communication information 212 is set for each adjacent stations (a to n) adjacent to the wireless base station 100.

Figure 3:
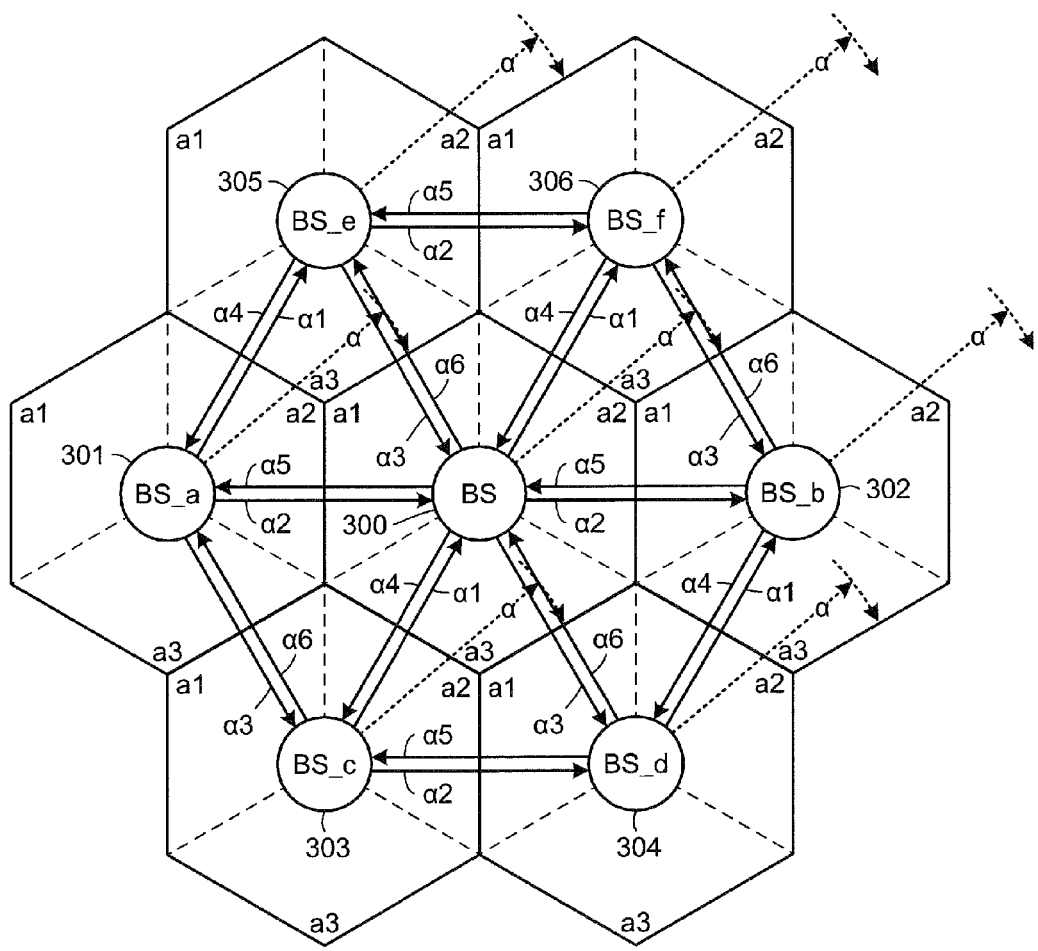
FIG. 3 is an explanatory diagram of arrangement of and intercommunication between wireless base stations.

FIG. 3 is an explanatory diagram of arrangement of and intercommunication between wireless base stations. As depicted in FIG. 3, a wireless base station (BS) 300 located at the center of FIG. 3 and other wireless base stations adjacent to the wireless base station 300 (adjacent stations) include six stations BSa to BSf.

Each of the wireless base stations 300 to 306 forms three sectors 1 to 3, in each of which the arrayed antenna 104 is used as a sector antenna. Hence, each of the wireless base stations 300 to 306 outputs a directional beam a that includes configuration information respectively therefor and rotates in synchronization among the wireless base stations. In this embodiment, it is assumed that the directional beam α rotates clockwise about each wireless base station 300 to 306, as depicted in FIG. 3, and that the initial output direction of a directional beam output from each of the wireless base stations 300 to 306 is the direction of 12 o'clock (upward direction in FIG. 3).

Herein, a procedure of communication between adjacent wireless base stations is described with respect to the wireless base station (BS) 300. It is assumed in the following description, for example, that a directional beam a output from the wireless base station (BS) 300 rotates clockwise, but the direction of rotation is not limited to the clockwise direction. At the start, the directional beam α rotates in the coverage area of sector α2 of the wireless base station (BS) 300. As the rotation proceeds, a directional beam α1 output from the wireless base station (BS) 300 reaches an adjacent wireless base station (BSf) 306, which is thus able to acquire configuration information of the wireless base station (BS) 300. At this time, because of the directional beam α rotating in synchronization with the wireless base stations, a directional beam α1 output from an adjacent wireless base station (BSc) 303 is received by the wireless base station (BS) 300, which is thus able to acquire configuration information of the adjacent wireless base station (BSc) 303.

Thereafter, the directional beam α output from the wireless base station (BS) 300 rotates to take the direction of an angle α2, whereby a wireless base station (BS) 302 receives the directional beam α2 and is able to acquire the configuration information of the wireless base station (BS) 300. At this time, a wireless base station (BSa) 301 outputs a directional beam in the direction of the angle α2. The wireless base station (BS) 300 thus receives a directional beam α2 from the wireless base station (BSa) 301 and is able to acquire configuration information of the adjacent wireless base station (BSa).

Thereafter, the directional beam α from the wireless base station (BS) 300 is output from the arrayed antenna 104 in the coverage area of sector 2 and rotates to take the direction of an angle α3. A wireless base station (BSd) 304 thus receives a directional beam α3 to be able to acquire the configuration information of the wireless base station (BS) 300. At the same time, a wireless base station (BSe) 305 outputs a directional beam in the direction of the angle α3. As a result, the wireless base station (BS) 300 is able to acquire configuration information of the wireless base station (BSe) 305.

Thereafter, the directional beam α output from the wireless base station (BS) 300 further rotates toward an angle α4, whereby the wireless base station (BSc) 303 receives a directional beam α4 and acquires the configuration information of the wireless base station (BS) 300. At this time, the wireless base station (BSf) 306 outputs a directional beam in the direction of the angle α4. As a result, the wireless base station (BS) 300 is able to acquire configuration information of the wireless base station (BSf) 306.

Thereafter, the directional beam α from the wireless base station (BS) 300 is output from the arrayed antenna 104 in the coverage area of the sector 3 and rotates to take the direction of an angle α5. The wireless base station (BSa) 301 thus receives a directional beam α5 and is able to acquire the configuration information of the wireless base station (BS) 300. At this time, the wireless base station (BSb) 302 outputs a directional beam in the direction of the angle α5. As a result, the wireless base station (BS) 300 is able to acquire configuration information of the wireless base station (BSb) 302.

Thereafter, the directional beam α output from the wireless base station (BS) 300 rotates to take the direction of an angle α6, whereby the wireless base station (BSe) 305 receives a directional beam α6 and is able to acquire the configuration information of the wireless base station (BS) 300. At this time, the wireless base station (BSd) 304 outputs a directional beam in the direction of the angle α6. The wireless base station (BS) 300 thus receives a directional beam α6 from the wireless base station (BSd) 304 and is able to acquire configuration information of the wireless base station (BSd) 304.

In FIG. 3, for convenience, the adjacent wireless base stations 301 to 306 are arranged uniformly in distance and direction around the wireless base station (BS) 300 so that the directional beam α is rotated about the entire circumference (360 degrees). In a configuration in which wireless base stations communicate with each other in a time-division manner using such a directional beam α, even if the number of adjacent wireless base stations and mutual positional and directional relations are uneven or different, the output power of the directional beam and the number of communication slots can be changed for each of the adjacent wireless base stations. Because the directional beam α is rotated to allow individual wireless base stations to communicate directly with each other, the distance that can be reached by a beam becomes longer than that achieved by a nondirectional beam, enabling stable transmission/reception. Each wireless base station is able to transmit and receive configuration information with respect to a single specific wireless base station since interference with another adjacent station is prevented. Use of the directional beam enables communication between wireless base stations while suppressing interference with a terminal in the coverage area.

FIG. 4 is a timing chart of a communication process by the wireless base station 100. FIG. 4 describes a process of transmission and reception of the configuration information as described with reference to FIG. 3. The horizontal axis in FIG. 4 represents time. A downlink channel frame of a wireless base station is divided into an inter-base-station communication area T0 and a user data transmission area TU. In the inter-base-station communication area T0, multiple time slots (TS1) 401 to (TS7) 407 in the header portion are used to communicate configuration information between the wireless base station and the wireless base stations (BS_a) to (BS_f) adjacent to the wireless base station. Subsequently, in the user data transmission area TU, downlink transmission data is transmitted to a terminal in the coverage area of the wireless base station (BS) 300. During the period of the user data transmission area TU, the directional beam α is not transmitted but rather a nondirectional beam is transmitted toward the entire coverage area. In another configuration, however, the directional beam may be transmitted to a specific terminal.

The wireless base station (BS) 300, among the time slots in the period of the inter-base-station communication area T0, uses the time slot TS1 as a period for transmitting configuration information from the transmitting unit 102 (see FIG. 1) to the adjacent wireless base stations (BSa) 301 to (BSf) 306. The other time slots TS2 to TS7 are used as periods for receiving configuration information from the adjacent wireless base stations (BSa) 301 to (BSf) 306 through the receiving unit 103. In this manner, in the downlink channel of the wireless base station 300, timing of transmission and reception is switched in the inter-base-station communication area T0, while data transmission is performed in the user data transmission area TU.

Timing of transmission/reception of configuration information will be described for each of the angles α1 to α6 that the directional beam α takes. When the directional beams α from the wireless base station 300 and an adjacent station are at the angle α1, in the downlink channel of the wireless base station (BS) 300, the wireless base station (BS) 300 transmits the directional beam α1 to the adjacent wireless base station (BSf) 306, using the time slot (TS1) 401. The wireless base station (BS) 300, using the time slot (TS5) 405, then receives the directional beam that the wireless base station (BSc) 303 transmits using the time slot (TS5) 405.

In transmission/reception timing in the downlink channel of the wireless base station (BS) 300, the inter-base-station communication area T0 is shared in such a way that the time area of the time slot (TS1) 401 is devoted to transmission of the directional beam α1, while the rest of the inter-base-station communication area T0, that is, the period of the time slots (TS2) 402 to (TS7) 407 is devoted to reception of the directional beam α1 from the adjacent wireless base station. In this period, the directional beam α1 from the wireless base station (BSc) 303 is received at the time slot (TS5) 405. The user data transmission area TU then follows, in which period user data 410 is transmitted through the downlink channel to the terminal in the coverage area of the wireless base station BS. Thereafter, during a period in which the directional beam α rotates to proceed from the angle α1 to the angle α2, intermittent transmission is carried out in the inter-base-station communication area T0 for communication with the adjacent stations.

When the directional beam α rotates to take the angle α2, the wireless base station (BS) 300 transmits the directional beam to the wireless base station (BSb) 302, using the time slot (TS1) 401 in the downlink channel. Meanwhile, the wireless base station (BSa) 301 transmits the directional beam α2, using the time slot (TS6) 406, to the wireless base station (BS) 300, which receives the directional beam α2. Subsequently, the user data 410 is transmitted through the downlink channel to the terminal in the coverage area of the wireless base station BS. Thereafter, during a period in which the directional beam α rotates to proceed from the angle α2 to the angle α3, intermittent transmission is carried out in the inter-base-station communication area T0 for communication with the adjacent stations.

When the directional beam α rotates to take the angle α3, the wireless base station (BS) 300 transmits the directional beam α3 to the wireless base station (BSd) 304, using the time slot (TS1) 401 in the downlink channel. Meanwhile, the wireless base station (BSe) 305 transmits the directional beam α3, using the time slot (TS7) 407, to the wireless base station (BS) 300, which receives the directional beam α3. Subsequently, the user data 410 is transmitted through the downlink channel to the terminal in the coverage area of the wireless base station BS. Thereafter, during a period in which the directional beam α rotates to proceed from the angle α3 to the angle α4, intermittent transmission is carried out in the inter-base-station communication area T0 for communication with the adjacent stations.

When the directional beam α rotates to take the angle α4, the wireless base station (BS) 300 transmits the directional beam α4 to the wireless base station (BSc) 303, using the time slot (TS1) 401 in the downlink channel. Meanwhile, the wireless base station (BSf) 306 transmits the directional beam α4, using the time slot (TS2) 402, to the wireless base station (BS) 300, which receives the directional beam α4. Subsequently, the user data 410 is transmitted through the downlink channel to the terminal in the coverage area of the wireless base station BS. Thereafter, during a period in which the directional beam α rotates to proceed from the angle α4 to the angle α5, intermittent transmission is carried out in the inter-base-station communication area T0 for communication with the adjacent stations.

When the directional beam α rotates to take the angle α5, the wireless base station (BS) 300 transmits the directional beam α5 to the wireless base station (BSa) 301, using the time slot (TS1) 401 in the downlink channel. Meanwhile, the wireless base station (BSb) 302 transmits the directional beam α5, using the time slot (TS3) 403, to the wireless base station (BS) 300, which receives the directional beam α5. Subsequently, the user data 410 is transmitted through the downlink channel to the terminal in the coverage area of the wireless base station BS. Thereafter, during a period in which the directional beam α rotates to proceed from the angle α5 to the angle α6, intermittent transmission is carried out in the inter-base-station communication area T0 for communication with the adjacent stations.

When the directional beam α rotates to take the angle α6, the wireless base station (BS) 300 transmits the directional beam α6 to the wireless base station (BSe), using the time slot (TS1) 401 in the downlink channel. Meanwhile, the wireless base station (BSd) 304 transmits the directional beam α6, using the time slot (TS4) 404, to the wireless base station (BS) 300, which receives the directional beam α6. Subsequently, the user data 410 is transmitted through the downlink channel to the terminal in the coverage area of the wireless base station BS. Thereafter, during a period in which the directional beam α rotates to proceed from the angle α6 to the angle α1, intermittent transmission is carried out in the inter-base-station communication area T0 for communication with the adjacent stations.

According to the above process, the wireless base station (BS) 300 transmits the configuration information thereof to adjacent wireless base stations (BSa) 301 to (BSf) 306 by always using the same time slot TS1 for transmission, regardless of the rotation angels (α1) to (α6) of the directional beam α. The adjacent wireless base stations (BSa) to (BSf), on the other hand, transmit the configuration information thereof to the wireless base station (BS) 300, using the time slots (TS2) to (TS7) respectively for reception by the wireless base station (BS) 300. In this manner, the adjacent stations carry out transmission using the time slots (TS2) to (TS7) in synchronization with the rotation of the arrayed antenna 104, and the wireless base station 300 carries out reception using these time slots (TS2) to (TS7). Hence, transmission/reception timing between the wireless base stations is synchronized.

The configuration for transmission/reception of the configuration information is not dependent on communication method. The configuration is thus applicable not only to a Time Division Multiple Access (TDMA) communication method for time division multiplexing but also to various multiple access communication methods, such as Frequency Division Multiple Access (FDMA) and Code Division Multiple Access (CDMA), and to multicarrier communication methods, such as Orthogonal Frequency Division Multiplexing (OFDM).

Exchanges of configuration information between an additionally set up wireless base station (additional station) and an adjacent station that are carried out when the additional station is newly set up will be described. Herein, description is given with respect to the additional station.

Figure 6A:
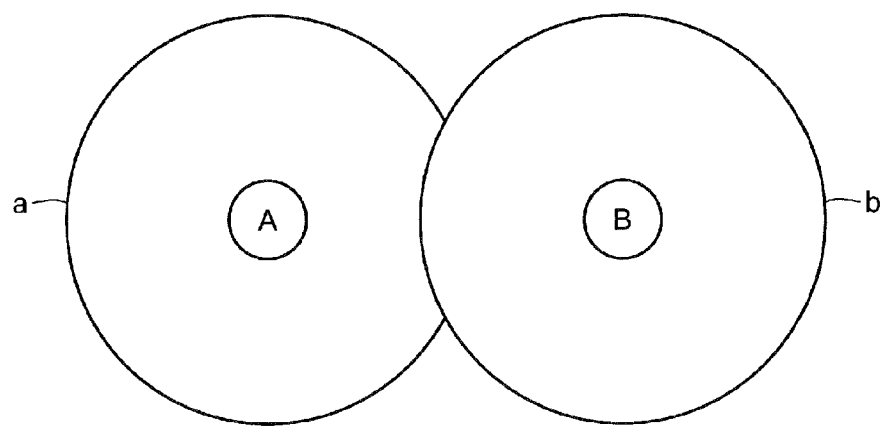
FIG. 6A depicts arrangement and coverage areas of the adjacent stations and the additional station.

FIG. 5 is a sequence diagram of exchanges of information between an additional station and adjacent stations. FIGS. 6A to 6D depict the arrangement and coverage areas of the adjacent stations and the additional station. Adjacent station_A 501 and adjacent station_B 502 are arranged as depicted in FIG. 5, and adjacent station_A 501 and adjacent station_B 502 have a coverage area_a and a coverage area_b, respectively, as depicted in FIG. 6A.

Figure 6B:
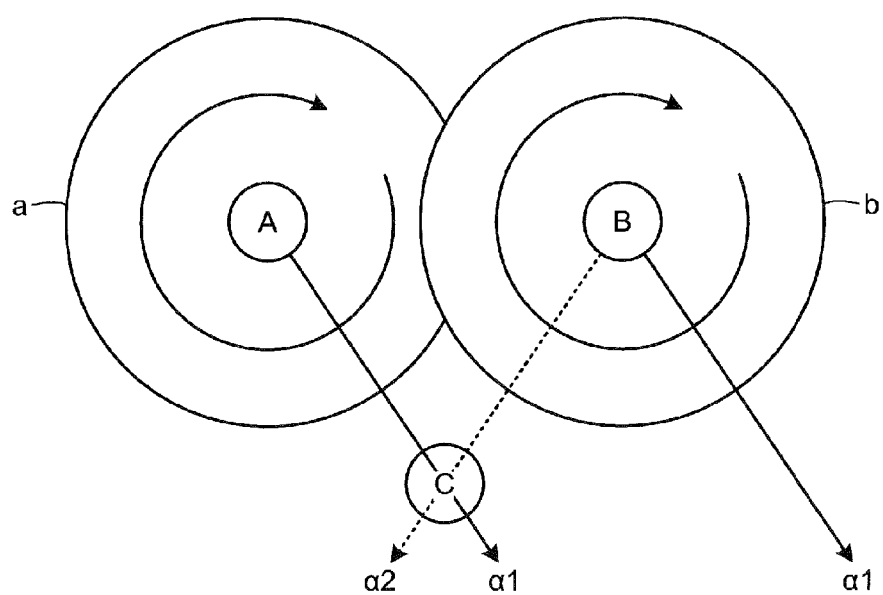
FIG. 6B depicts arrangement and coverage areas of the adjacent stations and the additional station.

As depicted in FIG. 5, an additional station_C 503 is newly set up at step S501. In this case, adjacent station_A 501 transmits configuration information (position information, transmission power, transmission timing, etc.) (step S502). Adjacent station_B 502 also transmits configuration information (position information, transmission power, transmission timing, etc.) (step S503). As depicted in FIG. 6B, the configuration information is incorporated into the directional beams α and is transmitted through the arrayed antennas 104. The directional beams α are rotated about the adjacent station_A 501 and the adjacent station_B 502 and the rotation angles thereof are synchronized with each other.

Additional station_C 503 stands by waiting for incoming signals, and receives the configuration information transmitted from adjacent station_A 501 and adjacent station_B 502. As depicted in FIG. 6B, additional station_C 503 receives the configuration information from adjacent station_A 501 when the directional beams α are at the angle α1, and receives the configuration information from adjacent station_B 502 when the directional beams α are at the angle α2.

Additional station_C 503 thus acquires the position information, transmission power, transmission timing, etc., respectively for adjacent station_A 501 and adjacent station_B 502, which have transmitted the configuration information. Additional station_C 503 then causes the incoming direction estimating unit 116 (FIG. 1) to determine the incoming direction of a beam, causes the adjacent station configuration information detecting unit 118 to determine reception power, and stores the configuration information of adjacent station_A 501 and adjacent station_B 502 in the configuration information memory unit 110. Based on the configuration information of adjacent station_A 501 and adjacent station_B 502, the configuration information control unit 111 computes configuration information for additional station_C 503, such as transmission power (step S504), and stores the computed configuration information to the configuration information memory unit 110. The contents of the configuration information of a given wireless base station and the adjacent stations are depicted in FIG. 2.

Figure 6C:
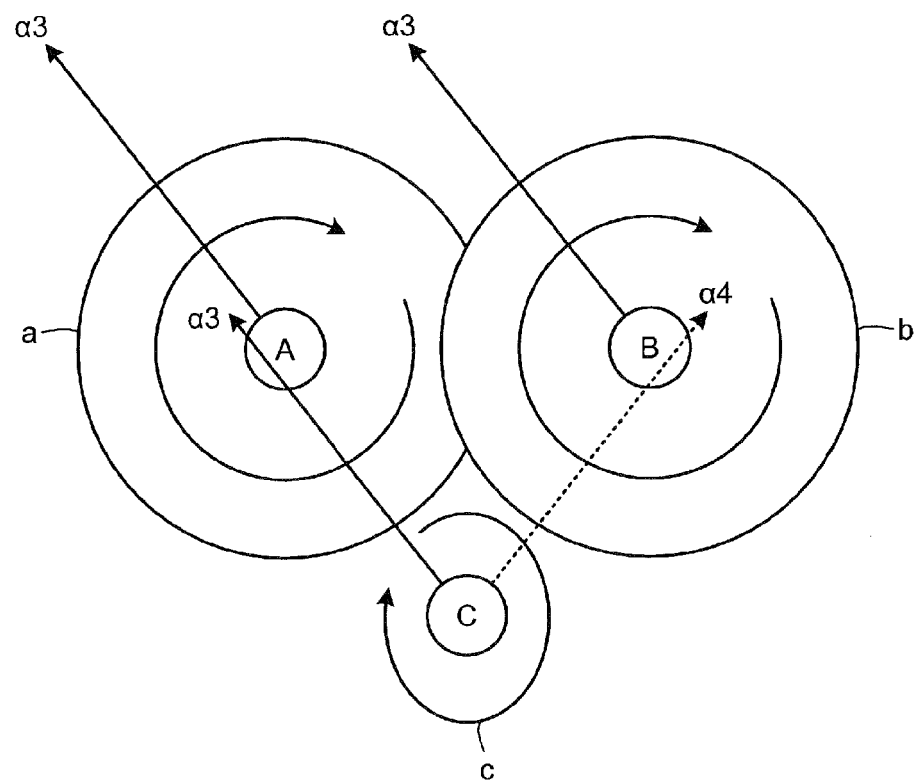
FIG. 6C depicts arrangement and coverage areas of the adjacent stations and the additional station.

Additional station_C 503 transmits to adjacent station_A 501 and adjacent station_B 502, the configuration information determined by the configuration information control unit 111. As depicted in FIG. 6C, additional station_C 503 has a coverage area c covering an area that does not affect the coverage areas a or b of adjacent station_A 501 and adjacent station_B 502. Additional station_C 503 may include the configuration information in a base station addition request to transmit the configuration information (steps S505 and S506). The directional beam α transmitted from additional station_C 503 is received by adjacent station_A 501 when the directional beam α is at the angle α3 (corresponding to step S505). Thereafter, when the directional beam α takes the angle α4, adjacent station_B 502 receives the directional beam α delayed by a given amount of time (corresponding to step S506). At steps S505 and S506, the same directional beam α is used but different times of arrival of the directional beam α result.

In timing transmission of the configuration information, additional station_C 503 having the arrayed antenna 104 transmits the configuration information in synchronization with the rotation of the directional beams at adjacent station_A 501 and adjacent station_B 502.

If the additional station_C 503 does not have an arrayed antenna configuration, for example, if additional station_C 503 is a small-sized base station, additional station_C 503 may transmit the configuration information in periodic timing assigned as timing unique to additional station_C 503. In this case, adjacent station_A 501 and adjacent station_B 502 receive a nondirectional beam transmitted from additional station_C 503, and are able to detect the configuration information from the additional station_C 503 at a time slot unique to additional station_C 503.

Thereafter, if the received configuration information (transmission power, position information) of additional station_C 503 indicates a need for alteration of the coverage areas a and b, adjacent station_A 501 and adjacent station_B 502 respectively alter transmission power. When having altered the transmission power, adjacent station_A 501 and adjacent station_B 502 transmit base station addition responses including altered configuration information (transmission power, etc.) to additional station_C 503 (steps S507 and S508). If the configuration information is not altered, adjacent station_A 501 and adjacent station_B 502 transmit base station addition responses reporting no alteration of the configuration information. This base station addition response is transmitted from adjacent station_A 501 to additional station_C 503 when the directional beam α from adjacent station_A 501 is at the angle α1, and is transmitted from adjacent station_B 502 to additional station_C 503 when the directional beam α from adjacent station_B 502 is at the angle α2 (see FIG. 6B).

Figure 6D:
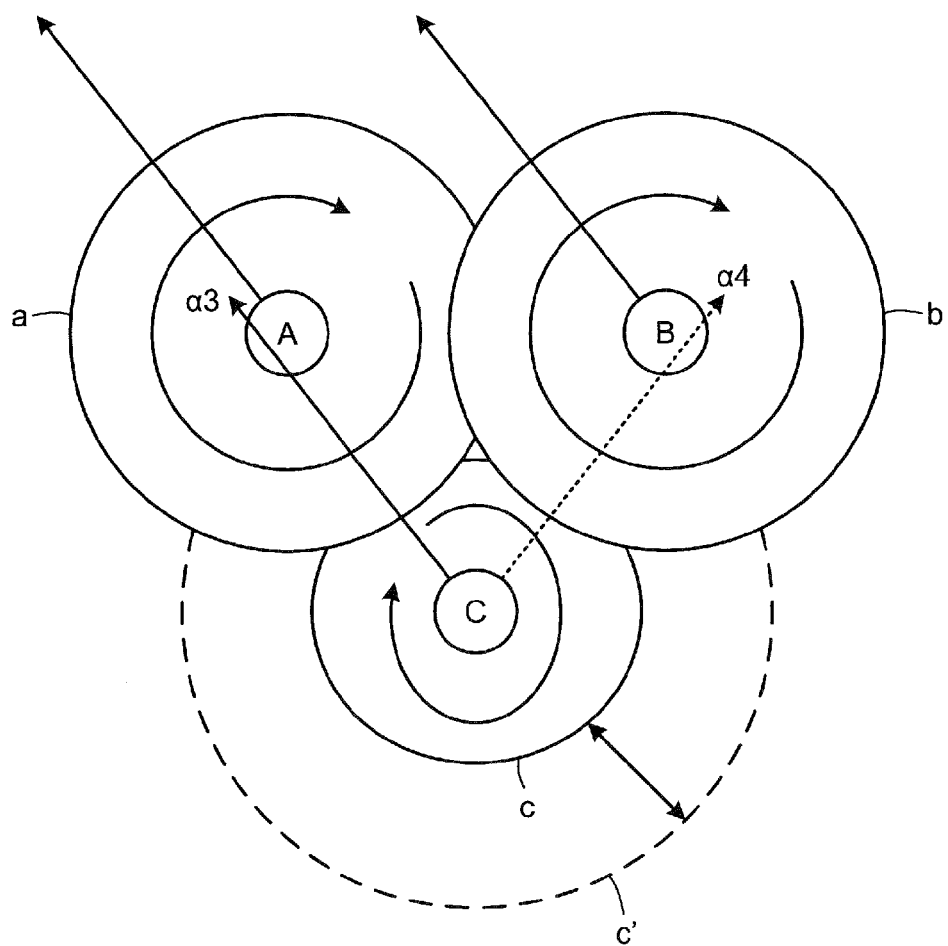
FIG. 6D depicts arrangement and coverage areas of the adjacent stations and the additional station.

Finally, as depicted in FIG. 5, additional station_C 503 having received the base station addition responses from adjacent stations (A) 501 and (B) 502, transmits a transmission start notification to adjacent station_A 501 and adjacent station (B) (step S509). The transmission start notification is received by adjacent station_A 501 when the directional beam α is at the angle α3, and is received by adjacent station_B 502 when the directional beam α is at the angle α4. The additional station_C 503 then starts transmission based on the set configuration information (transmission power, etc.) (step S510) to form the prescribed coverage area c. Additional station_C 503 then starts outputting user data to a terminal (step S511). FIG. 6D depicts a state where the transmission power of additional station_C 503 is increased to expand the coverage area c. The coverage area c is altered freely up to a range of a coverage area c', which results when output power is the maximum. Hence, the coverage area c can be adjusted to achieve the optimum mutual relation between the coverage area c and the coverage areas a and b of adjacent station_A 501 and adjacent station (B).

Herein, a case of additionally setting up a wireless base station has been described. In other cases where the arrangement of a given wireless base station and adjacent stations is not changed, configuration information for each wireless base station can be altered in response to a change in the radio propagation environment, an increase/decrease of users in the coverage area, etc. The described configurations include a configuration in which each wireless base station shares and stores the configuration information of FIG. 2, a configuration in which the configuration information is multiplexed, and a configuration in which a given wireless base station and an adjacent station communicate with each other in a given time period as depicted in FIG. 4 (inter-base-station communication area T0). Given these configurations, the wireless base station is able to transmit and receive configuration information while transmitting to and receiving from a terminal in the coverage area of the wireless base station, user data. As a result, even when uplink/downlink user data is being transmitted/received with respect to terminals respectively in the coverage areas of the wireless base stations, during on-going actual operation, configuration information can be altered to alter the coverage area and the number of terminals accommodated in the coverage area.

Herein, a case has been described where the transmission power (coverage area) of an adjacent station is not altered but the transmission power (coverage area) of an additional station is controlled to be adjusted to the adjacent station. In another case, however, the transmission power (coverage area) of a given wireless base station is determined in advance and an adjacent station configuration information alteration request is made in place of a base station addition request at steps S505 and S506 of FIG. 5. This allows the adjacent station to alter its transmission power (coverage area). In this manner, the respective coverage areas of the wireless base stations making up a cellular system can be altered flexibly during actual operation.

Transmission of the synchronously rotating directional beam by each of the wireless base stations 300 to 306 enables an additional station to search for an adjacent station and thus, enables the additionally set up additional station to start up autonomously. According to the described configuration, the directional beam makes a full (360-degree) rotation in the coverage area. In another configuration, however, the arrayed antenna 104 may output a directional beam in each sector of the coverage area. For example, in a configuration in which the directional beam α is output in each of the sectors 1 to 3 of FIG. 3, the directional beam α is rotated (swung) in the range of the angle (120 degrees) equivalent to one third of a complete circle. As a result, the additional station is able to transmit to and receive from an adjacent station, configuration information in one third of the time that is required when the directional beam α is rotated 360 degrees and therefore, able to execute a faster search.

The described configuration is applied not only to a wireless base station but also to communication with a relay station, such as a repeater/booster. If the configuration is applied to such a relay station, configuration information can be exchanged autonomously without requiring a wired transmission interface. In communication between the relay station and the wireless base station, an uplink channel is used for the directional beam directed to the wireless base station. This dispenses with return transmission to the wireless base station through a downlink channel.

According to the described embodiment, the wireless base station is able to provide configuration information thereof directly to an adjacent wireless base station and is further able to directly acquire configuration information of an adjacent wireless base station. As a result, the configuration information is held in common by the wireless base stations, whereby sharing and alteration of the configuration information in a simple network configuration is enabled, achieving load distribution and cost reduction in the network. Each wireless base station is able to autonomously alter the configuration thereof in a flexible and efficient manner, in response to a change in the radio environment, an increase/decrease in the numbers of users in the coverage area, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless base station comprising:
a multiplexer that multiplexes (a) configuration information that is used by the wireless base station to control communication with a terminal in a coverage area of the wireless base station and is to be transmitted to a first adjacent wireless base station and (b) user data to be transmitted to the terminal;
an antenna for communicating with the terminal, wherein the antenna is an arrayed antenna having an array of elements;
a transmitting unit that transmits, via the antenna, the configuration information multiplexed by the multiplexer to the first adjacent wireless base station and the user data multiplexed by the multiplexer to the terminal;
a receiving unit that receives, via the antenna, configuration information from a second adjacent wireless base station and user data from the terminal;
a demultiplexer that separates the configuration information from the second adjacent wireless base station and the user data from the terminal;
a configuration information control unit that sets configuration information of the wireless base station, based on the configuration information from the second adjacent wireless base station separated by the demultiplexer;
a phase control unit that incorporates the configuration information transmitted via the arrayed antenna into a directional beam whose direction is changed by controlling phases of the array of elements;
a configuration information memory unit that stores the configuration information of the wireless base station and of the second adjacent wireless base station, wherein the configuration information is stored as information that indicates at least any one among coverage-area transmission power, transmission timing, position information, incoming direction of a directional beam, and coverage-area reception power, respectively, of the wireless base station and of the second adjacent wireless base station;
an incoming direction estimating unit that estimates an incoming direction of a directional beam received from the second adjacent wireless base station; and
an adjacent station configuration information detecting unit that determines a direction of and a position of the second adjacent wireless base station, based on position information of the wireless base station stored in the configuration information memory unit and the incoming direction of the directional beam estimated by the incoming direction estimating unit and stores to the configuration information memory unit as the configuration information, the determined direction and position, wherein the transmitting unit transmits a directional beam including the configuration information toward the second adjacent wireless base station, based on the direction and the position of the second adjacent wireless base station determined by the adjacent station configuration information detecting unit.

2. The wireless base station according to claim 1, wherein the configuration information control unit determines transmission power of the directional beam to the second adjacent wireless base station, based on reception power of the directional beam received from the second adjacent wireless base station.

3. The wireless base station according to claim 1, wherein the configuration information control unit alters the transmission power of the coverage area of the wireless base station, based on arrangement of the second adjacent wireless base station and the wireless base station and on the reception power of the coverage area of the second adjacent wireless base station.

4. The wireless base station according to claim 1, wherein the configuration information control unit newly transmits to the first adjacent wireless base station and receives from the second adjacent wireless base station, the configuration information, if an additional wireless base station is set up, a radio propagation environment of the wireless base station changes, or the number of users in the coverage area changes.

5. The wireless base station according to claim 1, wherein the phase control unit synchronizes a transmission direction of the directional beam from the wireless base station with the incoming direction of each directional beam from second adjacent wireless base stations.

6. The wireless base station according to claim 4, further comprising a phase control unit that synchronizes a transmission direction of the directional beam from the wireless base station with the incoming direction of each directional beam from second adjacent wireless base stations.

7. The wireless base station according to claim 5, wherein the phase control unit rotates the directional beam in a given direction about the wireless base station.

8. The wireless base station according to claim 6, wherein the phase control unit rotates the directional beam in a given direction about the wireless base station.

9. The wireless base station according to claim 5, wherein the phase control unit outputs the directional beam for each cell of the coverage area of the wireless base station and rotates the directional beam within a range of each cell.

10. The wireless base station according to claim 6, wherein the phase control unit outputs the directional beam for each cell of the coverage area of the wireless base station and rotates the directional beam within a range of each cell.

11. A communication method for a wireless base station, comprising:
    multiplexing (a) configuration information that is used by the wireless base station to control communication with a terminal in a coverage area of the wireless base station and is to be transmitted to a first adjacent wireless base station and (b) user data to be transmitted to the terminal;
    transmitting, via an antenna for communicating with the terminal, the configuration information multiplexed at the multiplexing to the first adjacent wireless base station and the user data multiplexed at the multiplexing to the terminal, wherein the antenna is an arrayed antenna having an array of elements;
    receiving, via the antenna, configuration information from a second adjacent wireless base station and user data from the terminal;
    demultiplexing the configuration information from the second adjacent wireless base station and the user data from the terminal;
    controlling to set configuration information of the wireless base station, based on the configuration information from the second adjacent wireless base station demultiplexed at the demultiplexing,
    incorporating the configuration information transmitted via the arrayed antenna into a directional beam whose direction is changed by controlling phases of the array of elements;
    storing the configuration information of the wireless base station and of the second adjacent wireless base station, wherein the configuration information is stored as information that indicates at least any one among coverage-area transmission power, transmission timing, position information, incoming direction of a directional beam, and coverage-area reception power, respectively, of the wireless base station and of the second adjacent wireless base station;
    estimating an incoming direction of a directional beam received from the second adjacent wireless base station;
    determining a direction of and a position of the second adjacent wireless base station, based on position information of the wireless base station and the incoming direction of the directional beam and storing as the configuration information, the determined direction and position; and
    transmitting a directional beam including the configuration information toward the second adjacent wireless base station, based on the direction and the position of the second adjacent wireless base station.

* * * * *